(12) United States Patent
Stewart et al.

(10) Patent No.: US 12,330,792 B2
(45) Date of Patent: Jun. 17, 2025

(54) PRIVACY PANEL FOR A PASSENGER SEAT

(71) Applicant: Safran Seats USA LLC, Gainesville, TX (US)

(72) Inventors: Christopher D. Stewart, Saint Jo, TX (US); Muhammad Ans Raffat, Denton, TX (US); Kevin M. Waters, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 143 days.

(21) Appl. No.: 18/025,434

(22) PCT Filed: Dec. 18, 2020

(86) PCT No.: PCT/US2020/066185
§ 371 (c)(1),
(2) Date: Mar. 9, 2023

(87) PCT Pub. No.: WO2022/055534
PCT Pub. Date: Mar. 17, 2022

(65) Prior Publication Data
US 2023/0331388 A1 Oct. 19, 2023

Related U.S. Application Data

(60) Provisional application No. 63/078,110, filed on Sep. 14, 2020.

(51) Int. Cl.
*B64D 11/06* (2006.01)
*A47C 7/62* (2006.01)
(Continued)

(52) U.S. Cl.
CPC ............ *B64D 11/0606* (2014.12); *A47C 7/62* (2013.01); *B60N 3/026* (2013.01); *B60N 2/91* (2018.02); *B60R 2011/0014* (2013.01)

(58) Field of Classification Search
CPC .................................................. B64D 11/0606
See application file for complete search history.

(56) References Cited

U.S. PATENT DOCUMENTS 1,500,524 A * 7/1924 Phillips .................. A47C 7/543
297/411.34
6,113,183 A * 9/2000 Koch ..................... B64D 11/06
297/162

(Continued)

FOREIGN PATENT DOCUMENTS

| DE | 202018103010 U1 | 6/2018 | |
|---|---|---|---|
| EP | 3901041 A4 * | 10/2021 | ............. B60N 3/002 |
| JP | 10075847 A * | 3/1998 | ............... B60N 2/46 |

OTHER PUBLICATIONS

International Patent Application No. PCT/US2020/066185, International Search Report and Written Opinion, dated May 31, 2021.

*Primary Examiner* — Robert Canfield
(74) *Attorney, Agent, or Firm* — Kilpatrick Townsend & Stockton LLP

(57) ABSTRACT

Described herein is a privacy panel for a passenger includes a main body positioned between adjacent passenger seats and an attachment mechanism removably coupled to the main body. The attachment mechanism may include a first attachment member couplable to an armrest of the passenger seat and a second attachment member coupled to the first attachment member. The second attachment member may be attachable to a fixed location on the passenger seat for preventing rotation of the armrest.

18 Claims, 7 Drawing Sheets

(51) Int. Cl.
  *B60N 2/75*  (2018.01)
  *B60N 2/90*  (2018.01)
  *B60N 3/02*  (2006.01)
  *B60R 11/00*  (2006.01)

(56) References Cited

U.S. PATENT DOCUMENTS

| | | | | |
|---|---|---|---|---|
| 6,260,903 | B1* | 7/2001 | von der Heyde | B60N 2/286 296/64 |
| 6,742,842 | B2* | 6/2004 | Dowty | B64D 11/064 297/184.17 |
| 9,956,898 | B1* | 5/2018 | Dellock | B60Q 3/68 |
| 10,479,506 | B1* | 11/2019 | Colletti | B60N 2/90 |
| 10,800,305 | B2* | 10/2020 | Garcia Sanchez | B60N 2/91 |
| 11,034,454 | B1* | 6/2021 | Malecha | B64D 11/06 |
| 11,291,306 | B2* | 4/2022 | Bergdoll | B60N 2/787 |
| 11,534,003 | B2* | 12/2022 | DeVries | A47C 7/62 |
| 12,202,605 | B2* | 1/2025 | Audelo Navarro | B64D 11/0644 |
| 2005/0194827 | A1* | 9/2005 | Dowty | B60N 3/06 297/411.3 |
| 2007/0085389 | A1* | 4/2007 | Schurg | B64D 11/0644 297/184.1 |
| 2008/0252109 | A1* | 10/2008 | Salzer | B60N 3/002 297/173 |
| 2008/0265638 | A1* | 10/2008 | Strasser | B64D 11/0606 297/217.1 |
| 2012/0038587 | A1* | 2/2012 | Alford | E06B 9/24 345/174 |
| 2013/0106080 | A1* | 5/2013 | Jarboe | B64D 11/0604 280/730.2 |
| 2013/0320722 | A1* | 12/2013 | Lavey | A47C 7/02 297/232 |
| 2014/0252821 | A1* | 9/2014 | Friedlander | B60N 3/002 297/232 |
| 2017/0015420 | A1* | 1/2017 | Henshaw | B64D 11/0606 |
| 2017/0215593 | A9* | 8/2017 | Chang | B60N 2/787 |
| 2020/0385124 | A1* | 12/2020 | Zhang | F16H 21/44 |
| 2021/0237880 | A1* | 8/2021 | Gaston | B64D 11/0606 |
| 2021/0330088 | A1* | 10/2021 | Castellon, Sr. | A47C 7/62 |
| 2021/0371110 | A1* | 12/2021 | Penley | B64D 11/0639 |
| 2021/0380256 | A1* | 12/2021 | Wisniewski | B64D 11/0606 |
| 2022/0048628 | A1* | 2/2022 | Varriano-Marston | B64D 11/0606 |
| 2022/0063812 | A1* | 3/2022 | Ryan | B64D 11/0606 |
| 2023/0264817 | A1* | 8/2023 | Audelo | B64D 11/0606 244/118.6 |
| 2023/0312095 | A1* | 10/2023 | Escobar | B64D 11/0606 244/118.6 |

* cited by examiner

PRIVACY PANEL FOR A PASSENGER SEAT

CROSS REFERENCE TO RELATED APPLICATIONS

This application is a claims the benefit of priority to U.S. Provisional Application Ser. No. 63/078,110, titled "SAFETY DIVIDER FOR AIRCRAFT PASSENGER SEATS" and filed Sep. 14, 2020, the entire contents of each of which are hereby incorporated by reference.

FIELD OF THE INVENTION

Embodiments of the present invention relate to passenger seats, and, more particularly, to dividers for passenger seats.

BACKGROUND

In many instances, passenger vehicles, such as aircraft, buses, trains, ships, and automobiles, include a cabin in which passengers are seated and can move about. The arrangement of the cabin needs to provide optimum safety conditions and a sufficient number of seats per cabin to meet the economical requirements related to passenger transport while also providing the passengers a high level of comfort. Moreover, increased awareness surrounding air transmitted pathogens has resulted in an increased scrutiny of passenger safety, especially in enclosed spaces. However, traditional aircraft cabins often do not provide the ability for passengers to socially distance or isolate. Therefore, there is still a need for passenger seats that may provide separation for passengers.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a privacy panel for a passenger includes a main body positioned between adjacent passenger seats and an attachment mechanism removably coupled to the main body. The main body may include an upper end and a lower end, and the attachment mechanism may be removably coupled to the main body proximate the lower end. The attachment mechanism may include a first attachment member couplable to an armrest of the passenger seat and a second attachment member coupled to the first attachment member. The second attachment member may be attachable to a fixed location on the passenger seat for preventing rotation of the armrest.

In some embodiments, the main body includes a concave portion along an edge extending between the upper end and the lower end.

In some embodiments, the privacy panel further includes at least one stability member coupled to the main body configured to contact a seatback of the adjacent passenger seats resulting in less rotation of an upper portion of the main body. The stability member may include projections that extend outward from opposing surfaces of the main body for contacting the adjacent passenger seats.

In some embodiments, the second attachment member extends from the first attachment member at a first end and couples to a seat structure between the adjacent passenger seats at a second end forms a loop around the fixed location forming a stop.

In some embodiments, the second attachment member extends from the attachment mechanism at a first end and couples to a seat bottom of the passenger seat at the second end. When the passenger is seated, a weight of the passenger may prevent rotation of the armrest.

According to certain embodiments, a privacy panel for a passenger includes a main body positioned between adjacent passenger seats and an attachment mechanism removably coupled to the main body. The main body may include an upper end and a lower end and the attachment mechanism may be removably coupled to the main body proximate the lower end. The attachment mechanism may include a first attachment member couplable to an armrest of the passenger seat and a second attachment member coupled to the first attachment member. The second attachment member may prevent rotation of the armrest.

According to certain embodiments, a privacy panel for a passenger includes a main body positioned between adjacent passenger seats and an attachment mechanism removably coupled to the main body. The main body may include an upper end and a lower end and the attachment mechanism may be removably coupled to the main body proximate the lower end. The attachment mechanism may include a first attachment member couplable to an armrest of the passenger seat and a second attachment member coupled to the first attachment member. The second attachment member may be attachable to a fixed location on the passenger seat for preventing rotation of the armrest. The privacy panel may further include a stability feature positioned on the main body and configured to contact a seatback of the adjacent passenger seats resulting in less rotation of the privacy panel in a lateral direction.

DETAILED DESCRIPTION

Figure 1A:
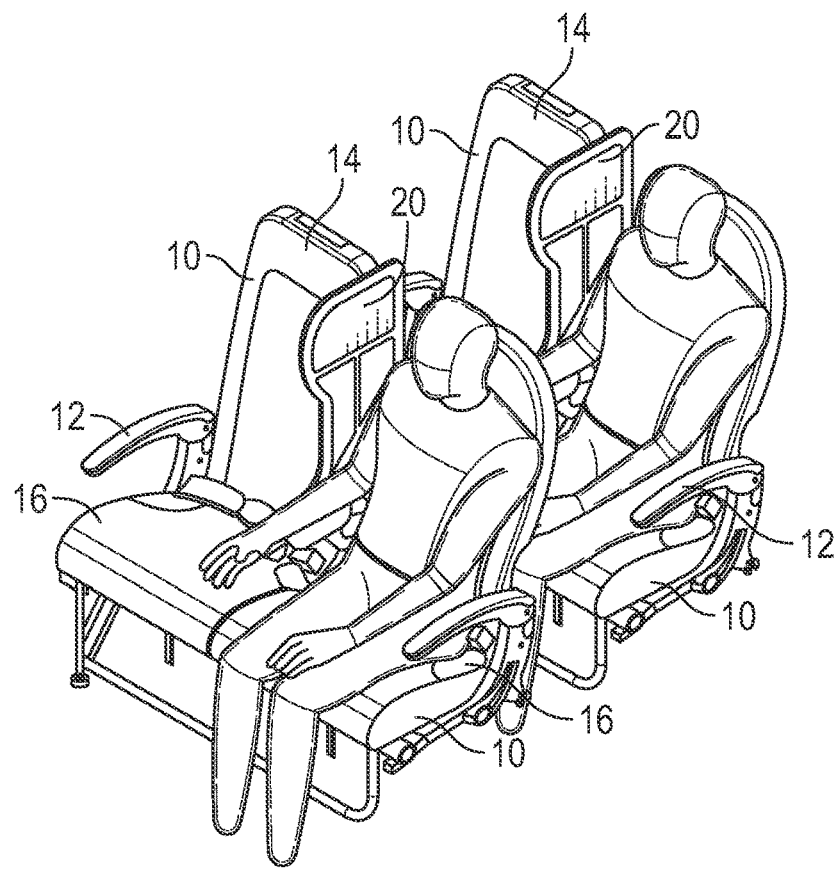
FIG. 1A is a perspective view of passenger seats with a privacy panel according to certain embodiments.
Figure 1B:
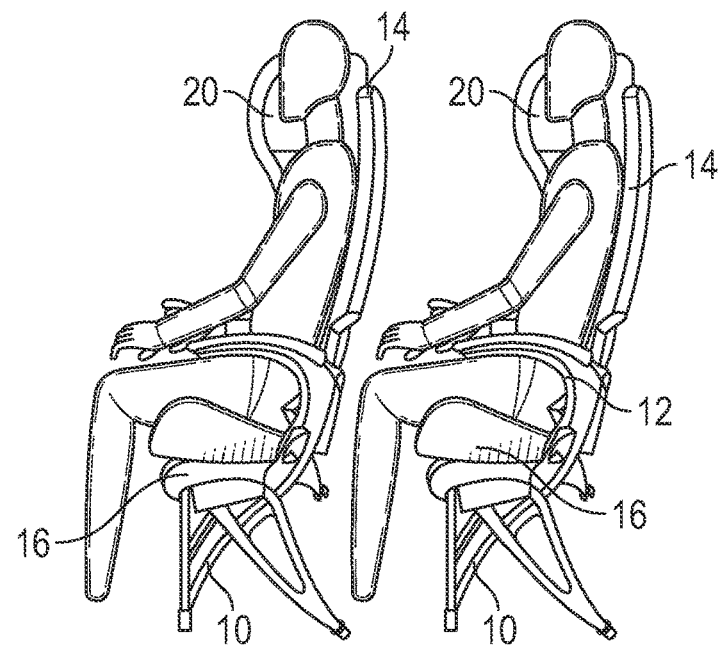
FIG. 1B is a side view of the passenger seats of FIG. 1A.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide privacy panels for a passenger seat. While the privacy panels are discussed for use with aircraft seats, they are by no means so limited. Rather, embodiments of the privacy panels may be used in passenger seats or other seats of any type as otherwise desired.

According to certain embodiments of the present invention, as shown in FIGS. 1A-B and 2A-B, a privacy panel 20 may be provided with a passenger seat 10, optionally such that the privacy panel 20 is positioned between adjacent passenger seats 10 thereby providing a barrier between passengers seated in the adjacent passenger seats 10. Each passenger seat 10 includes a seatback 14 and a seat bottom 16. In various embodiments, each passenger seat 10 may include at least one armrest 12. As discussed in greater detail below, in certain embodiments, the privacy panel 20 may be coupled to the armrest 12 via an attachment mechanism 30.

Figure 2A:
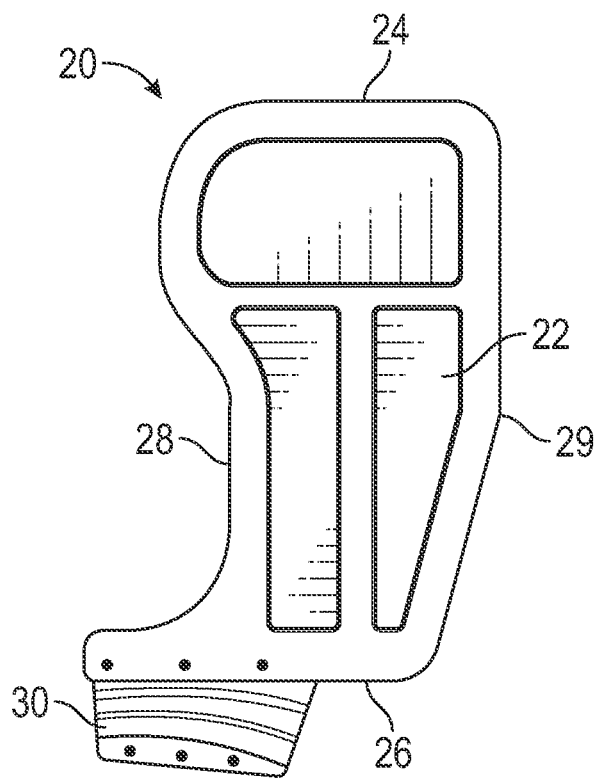
FIG. 2A is a side view of the privacy panel of FIG. 1A.
Figure 2B:
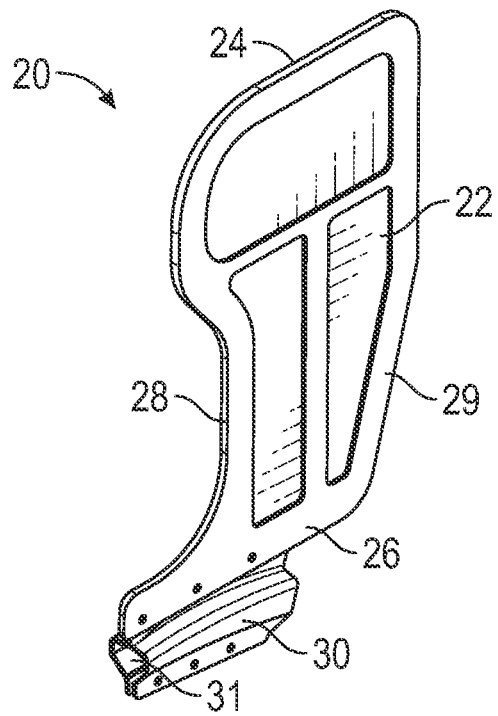
FIG. 2B is a perspective view of the privacy panel of FIG. 1A.
Figure 3A:
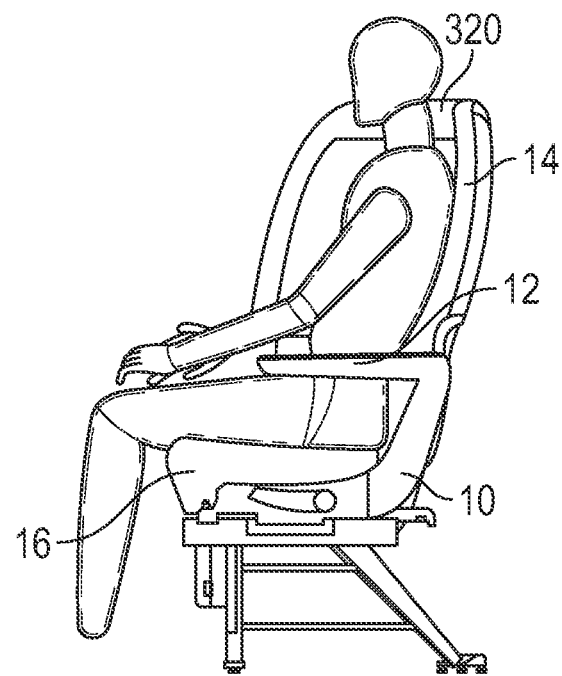
FIG. 3A is a side view of passenger seats with another privacy shell according to certain embodiments.
Figure 3B:
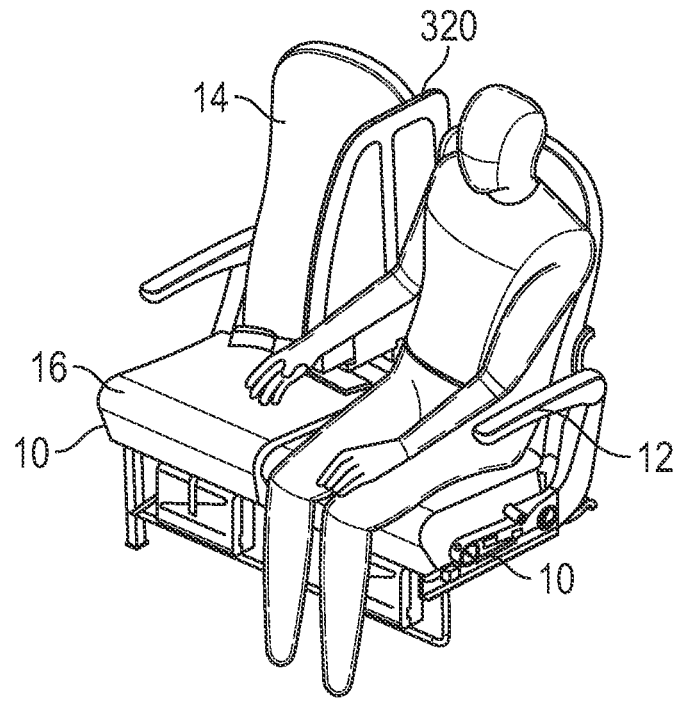
FIG. 3B is a perspective view of the passenger seats of FIG. 3A.

As best illustrated in FIGS. 2A-B, in certain embodiments, the privacy panel 20 includes a main body 22, an upper end 24, a lower end 26 opposite the upper end 24, a forward end 28, and a rearward end 29 opposite the forward end 28. In some non-limiting examples, the forward end 28 of the privacy panel 20 may include a concave portion between the upper end 24 and the lower end 26 where the forward end 28 curves toward the rearward end 29. However, the shape of the forward end 28 (or any other end of the privacy panel 20) should not be considered limiting, and the forward end 28 or other ends of the privacy panels described herein may have various shapes or profiles as desired. As a non-limiting example, FIGS. 3A-B, 4A-B, and 5 illustrate an embodiment of a privacy panel 320 where the forward end 28 includes a convex portion and curves away from the rearward end 29. Various other shapes or profiles of the ends may be provided as desired.

Referring back to FIGS. 1A-B, in certain embodiments, the privacy panel 20 is supported with the passenger seats 10 by attaching the attachment mechanism 30 with the armrest 12 of one of the passenger seats 10. As illustrated in FIG. 2B, the attachment mechanism 30 may define an opening 31 that receives at least a portion of the armrest 12. In certain embodiments, the privacy panel 20 is supported such that the lower end 26 extends along at least a portion of a length of the armrest 12 and such that the upper end 24 is positioned proximate an upper portion or headrest area of the seatback 10A of the passenger seat 10. In various embodiments, the rearward end 29 may be oriented between seatbacks 10A of adjacent passenger seats 10.

FIGS. 3A-B, 4A-B, and 6-8 illustrate another embodiment of a privacy panel 320 that may be used with the passenger seat 10 according to various embodiments. In certain aspects, the privacy panel 320 may be substantially similar to the privacy panel 20 except that the shape or profile of the ends of the main body 22 of the privacy panel 320. As a non-limiting example, and as previously discussed, compared to the privacy panel 20, the forward end 28 of the privacy panel 320 has a convex portion that curves away from the rearward end 29.

Figure 5:
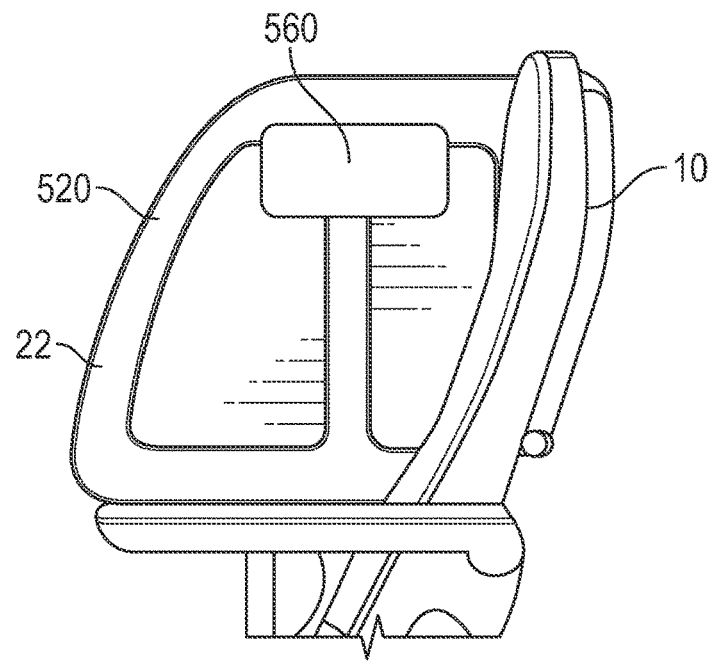
FIG. 5 is a side view of a passenger seat with another privacy panel having a window according to certain embodiments.

FIG. 5 illustrates another embodiment of a privacy panel 520 that is substantially similar to the privacy panel 320 except that the privacy panel 520 includes a window 560 positioned on the main body 22. The window 560 may be formed of a clear plastic or any other suitable material as desired, optionally such that a passenger may be able to see through the privacy panel 520 to the adjacent passenger seat 10. The window 560 may optionally include a cover (not shown) that may be slidably or otherwise coupled to the window 560 and/or the main body 22 such that a passenger may selectively adjust the cover and extent to which the window 560 is unobstructed, which may provide additional privacy if needed.

Figure 4A:
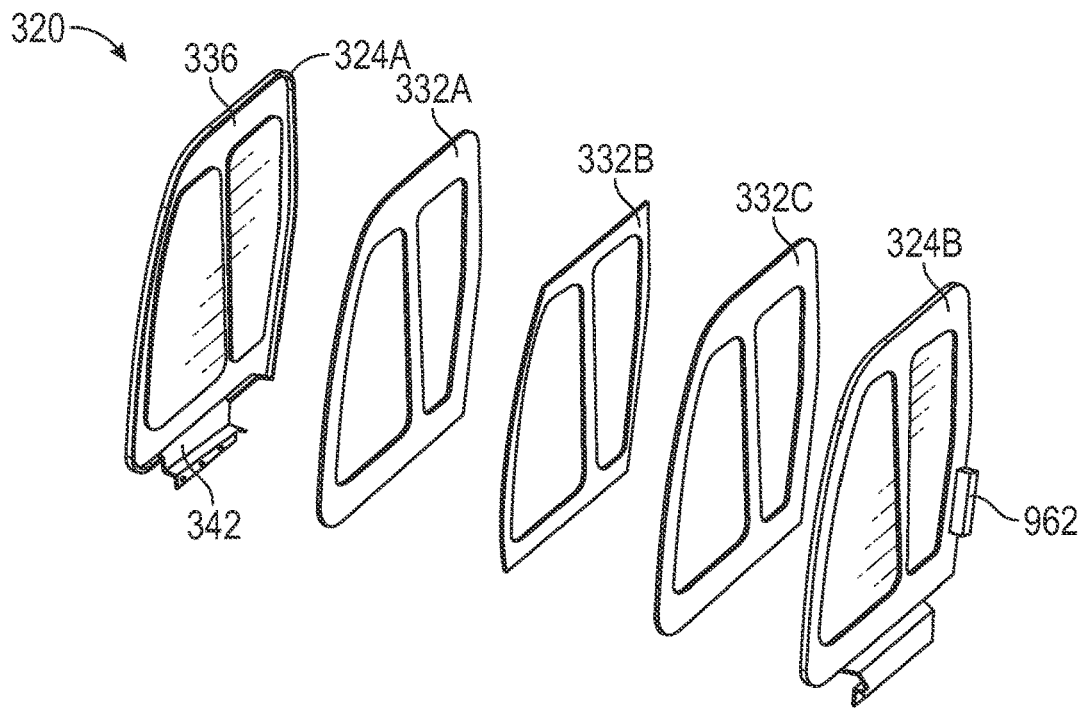
FIG. 4A is an exploded view of a portion of the privacy panel of FIG. 3A.
Figure 4B:
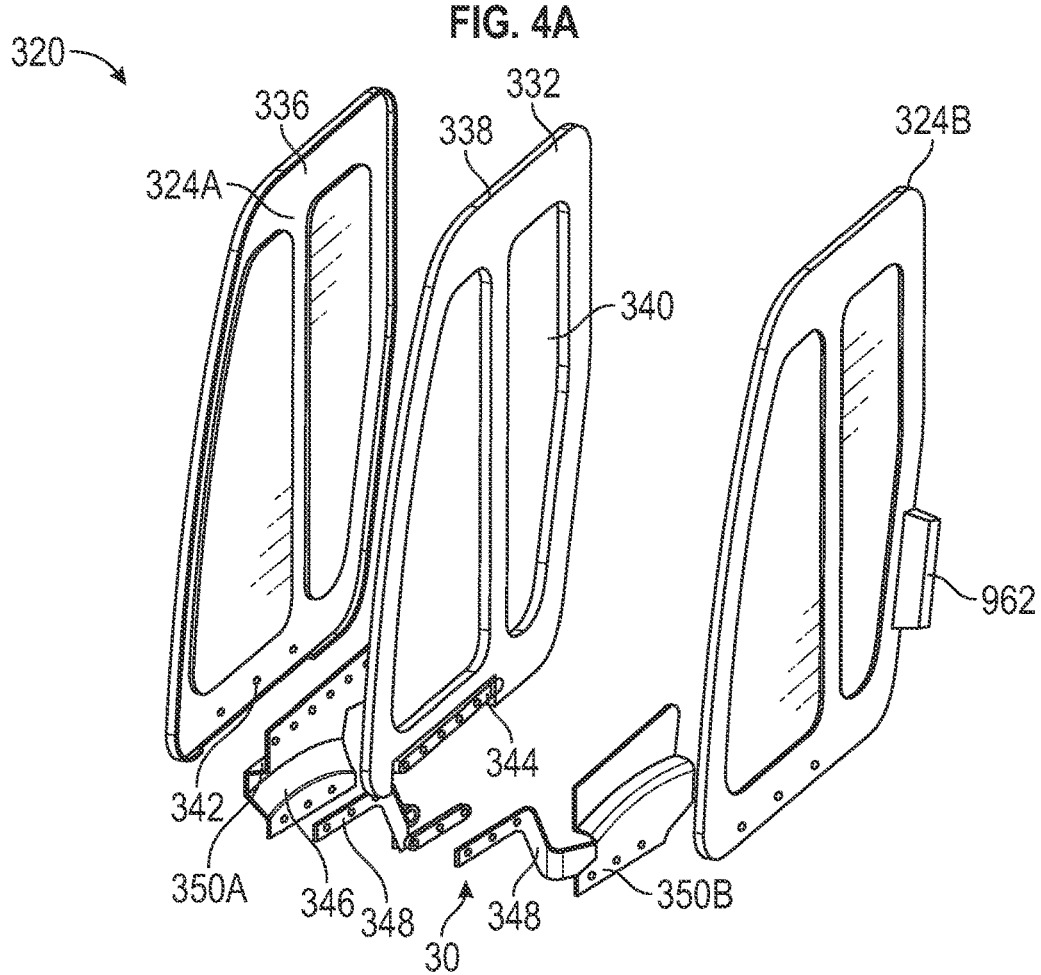
FIG. 4B is an exploded view of the privacy panel of FIG. 3A.

Referring back to the privacy panel 320, in some embodiments, and as best illustrated in FIGS. 4A-B, the privacy panel 320 may include at least one internal member 332 and a pair of external members 334A-B. FIG. 4A illustrates the privacy panel 320 with three internal members 332A-C, and FIG. 4B illustrates the privacy panel 320 with one internal member 332.

In some non-limiting examples, one or both of the external members 334A-B may formed of a polymer, for example, but not limited to, polycarbonate, polyethylene, polypropylene, polyethylene terephthalate, polyvinyl chloride, acrylonitrile butadiene styrene, or any other suitable polymer. Optionally, one or both of the external members 334A-B may include depressions, raised surfaces, or any desired ornamental features on an outer surface of the external members 334A-B. In certain embodiments, and as best illustrated on external members 334A in FIGS. 4A-B, an inner surface of the external members (e.g., the surfaces on each external member that face each other when the privacy panel 320 is assembled) may include positioning grooves 336 that generally correspond to the shape of the at least one internal member 332. In certain aspects, the positioning grooves 326 may allow for improved positioning and placement of the at least one internal member 332 relative to the external members 334A-B.

In some embodiments, the at least one internal member 332 may have a perimeter edge 338 and at least one cutout and/or opening 340 defined within the perimeter edge 338. Optionally, when the at least one internal member 332 is assembled with the external members 334A-B, a portion of the external members 334A-B may be received within the at least one opening 340, which may further position and place the at least one internal member 332 relative to the external members 334A-B. In various embodiments, the at least one internal member 332 may be formed of a material that is rigid such that the at least one internal member 332 provides stiffness to the privacy panel 320. In one non-limiting example, the at least one internal member 332 may be formed from rigid foam, although other materials may be utilized as desired. In certain embodiments, the combination of materials used in the external members 334 and the internal members 332 may provide sufficient structural integrity without unnecessary excess weight.

Each of the external members 334A-B and the at least one internal member 332 may include a recessed portion 342, 344, respectively for receiving the attachment mechanism 30, which will be discussed in further detail. When assembled, external members 334A-B may be attached to opposing sides of the internal member 332 and to each other, thereby forming a unitary structure. In some examples, the external members 334A-B and internal member 332 may be attached via adhesive. However, the external members 334A-B and the internal member 332 may be attached via any suitable attachment means as desired, including, but not limited to fasteners, welding, crimping, snap fit, or any other suitable attachment means.

As described above, the privacy panels described herein may include the attachment mechanism 30 for coupling the privacy panel to the passenger seat 10. In some embodiments, and as illustrated in FIGS. 4B and 6-8, the attachment mechanism 30 may include a first attachment member 346 and a second attachment member 348. The first attachment member 346 may include a first portion 350A configured to be received in one of the external members 334A-B and a complementary second portion 350B configured to be received in the other external member 334A-B. Each of the first portion 350A and the second portion 350B may optionally include a concave portion formed on an inner surface such that, when assembled, the opening 31 is formed within the first attachment member 346 that is sized and shaped to receive the armrest 12. When assembled, the first portion 350A and the second portion 350B may optionally be coupled to one another at an upper end and a lower end, and the armrest 12 may be disposed within the opening such that the first attachment member 346 is coupled to the armrest 12 in a clamping manner.

In some embodiments, the first attachment member 346 may be removably coupled to the main body 22 of the privacy panel 320. In particular, first attachment member 346 may be coupled to the lower end 26 of the main body 22 such that the upper end of each the first portion 350A and the second portion 350B are positioned within the recessed portions 342, 344 formed in each of the external member 334A-B and the internal member 332. The first attachment member 346 may be attached to the main body 22 of the privacy panel 320 via any suitable attachment means as desired, including, but not limited to, screws, bolts, crimping, welding, adhesive, or any other suitable attachment means.

In certain embodiments, and as illustrated in FIG. 4A, the first attachment member 346 may be integrally formed with the privacy panel 320. In particular, the first attachment member 346 may extend from the lower end 26 of the main body 22 on each of the external members 334A-B. In other embodiments and as previously discussed with reference to FIG. 4B, the first attachment member 346 may be a separate component that is attached separately to the privacy panel 320.

Figure 6:
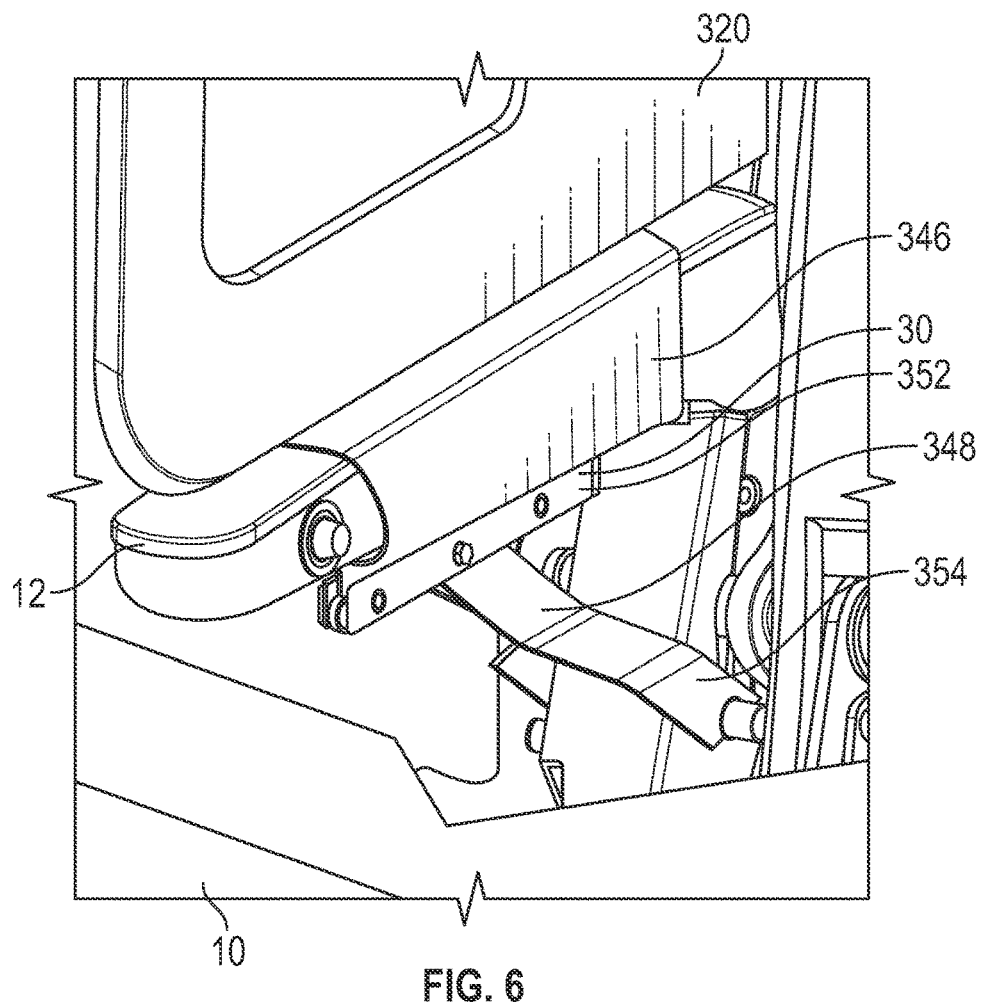
FIG. 6 is a perspective view of a portion of the privacy panel of FIG. 3A showing an attachment mechanism for the privacy panel.
Figure 7:
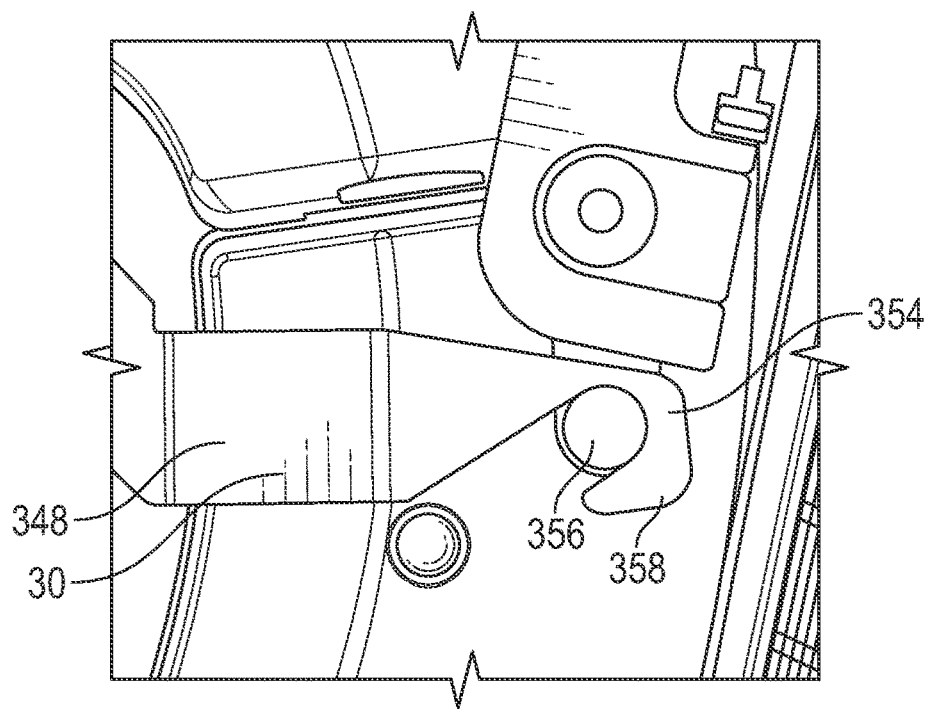
FIG. 7 is a perspective view of a portion of the privacy panel of FIG. 3A showing a second attachment member of the attachment mechanism of FIG. 6.

As mentioned, in certain embodiments the attachment mechanism 30 may further include the second attachment member 348. In some cases, and as illustrated in FIG. 4B, the attachment mechanism 30 may include more than one second attachment member 348, such as two second attachment members 348. In some embodiments, and as best illustrated in FIGS. 6 and 7, the second attachment member 348 includes a first portion 352 and a second portion 354.

The first portion 352 may be attachable to a lower end of the first attachment member 346 via any suitable attachment means including, but not limited to, screws, bolts, adhesive, welding, crimping, snap fit, or any other suitable attachment means. The second portion 354 may be attachable to a fixed location on the passenger seat 10 to minimize or prevent rotation of the armrest 12, and thus movement of the privacy panel 320. In some embodiments, as illustrated in FIGS. 6 and 7, the second portion 354 is optionally attached to a recline mechanism 356 of a tray table assembly of the passenger seat 10. As best illustrated in FIG. 7, the second portion 354 may include various features for attaching to the fixed location on the passenger seat. In the embodiment of FIG. 7, the second portion 354 includes a hook 358 that can loop around the recline mechanism 356 and thus prevent rotation of the armrest 12. Various other features may be used on the second portion 354 in addition to or in place of the hook 356 as desired. When assembled, the second portion 354 may be engaged and/or positioned with respect to the armrest 12 such that any attempt to rotate the armrest 12 will cause the second portion 354 to bump into existing seat structures, thereby preventing or minimizing rotation of the armrest 12.

Figure 8:
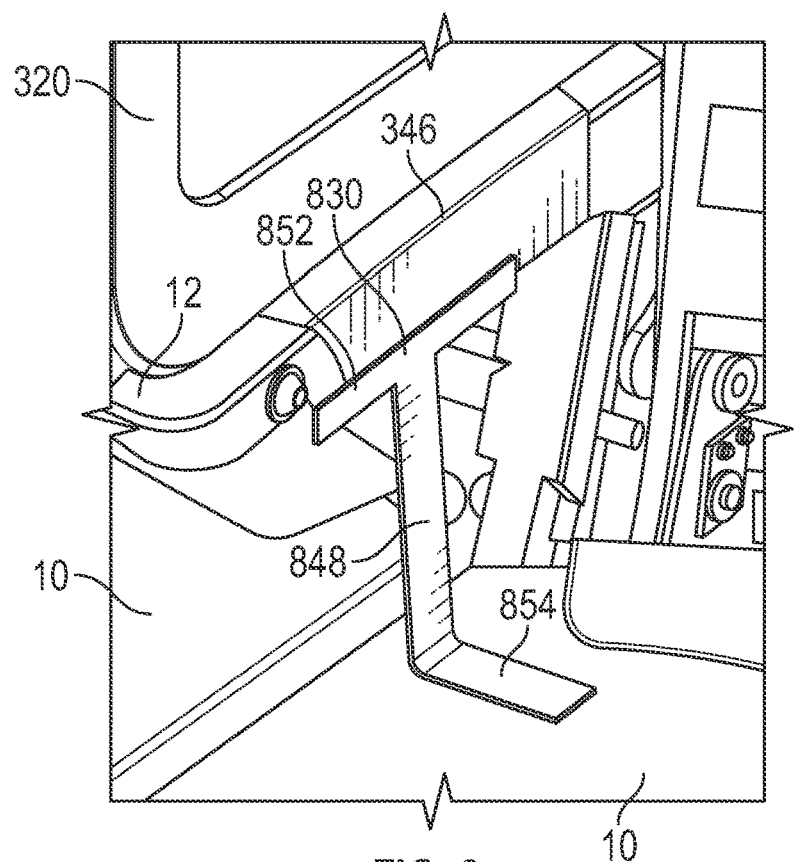
FIG. 8 is a perspective view of a portion of a passenger seat with privacy panel having an attachment mechanism according to certain embodiments.

FIG. 8 illustrations another example of an attachment mechanism 830 for the privacy panel 320 according to various embodiments. The attachment mechanism 830 is substantially similar to the attachment mechanism 30 and is configured to minimize or prevent rotation of the armrest 12. Compared to the second attachment member 348, a second attachment member 848 of the attachment mechanism 830 has a shape formed by a first portion 852 and a second portion 854 is different compared to that of the second attachment member 348. In addition, compared to the second attachment member 348, the second portion 854 of the second attachment member 848 is attachable to the seat bottom 16 of the passenger seat 10, optionally beneath a seat cushion. In some non-limiting examples, the second portion 854 may be coupled to the seat bottom 16 via hook and loop fasteners, however the second portion 854 may be coupled via any suitable attachment means, including, but not limited to, adhesive, sewing, stapling, or any other suitable attachment means as desired. When assembled, a weight of the passenger seated in the passenger seat 10 with the attachment mechanism 830 will provide additional security to the second portion 854 of the second attachment member 848 to minimize or prevent rotation of the armrest 12.

Figure 9A:
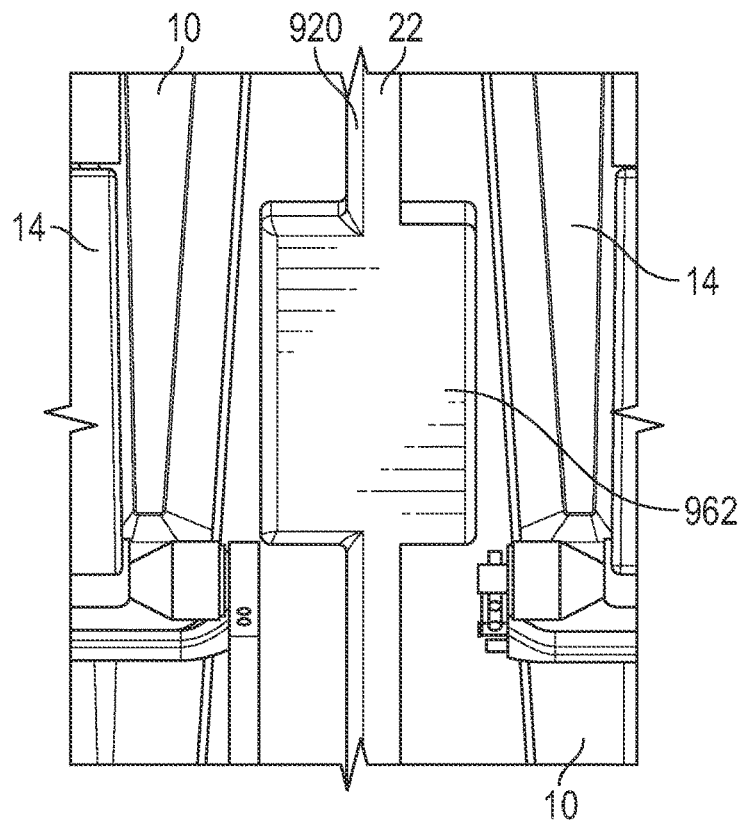
FIG. 9A is an end view of a portion of a privacy panel with a stability feature according to certain embodiments.
Figure 9B:
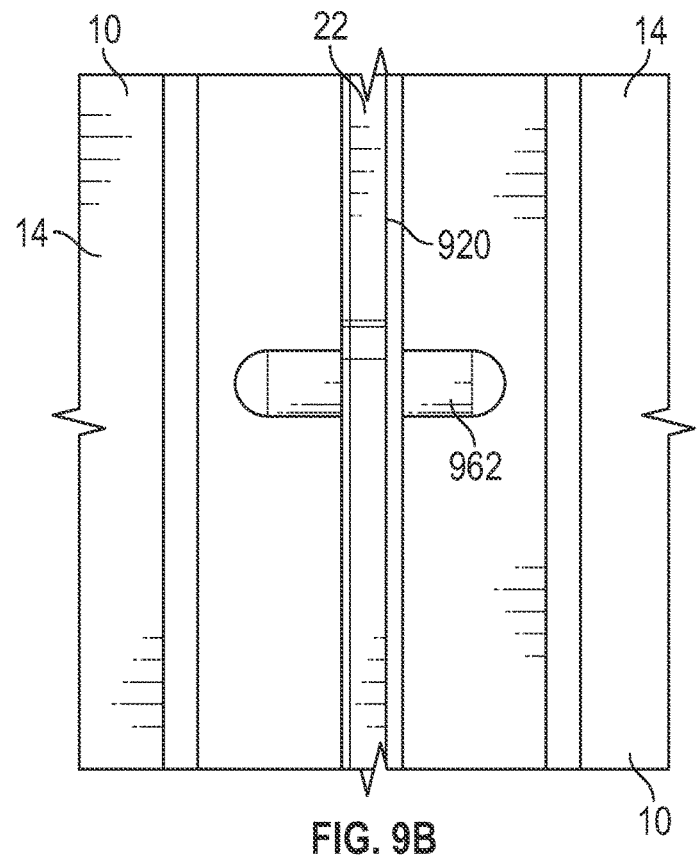
FIG. 9B is an end view of a portion of a privacy panel with another stability feature according to certain embodiments

Optionally, and referring to FIGS. 9A-9B, a privacy panel 920, which may be substantially similar to the other privacy panels described herein, may include at least one stability feature 962. In some embodiments, the stability feature 962 is positioned on the main panel 22 and comprises projections that extend outward from outer surfaces of the main body 22. In some examples, the stability feature 962 may be integrally formed with the main body 22 of the privacy panel 920, although in other examples, the stability feature 962 may be formed as a separate structure that is attached to the main body 22 via any suitable attachment means as desired. In operation, the stability feature 962 may minimize or reduce unwanted rotation or movement of the privacy panel 920 in the lateral direction (e.g., in a side-to-side direction, or direction generally transvers to a forward-and-aft direction). In certain embodiments, when used, the privacy panel 920 may be subjected to lateral forces (e.g., when bumped into from a lateral direction), and an upper portion of the privacy panel 920 may move or rotate in response to these lateral forces. In such cases, the stability feature 962 may contact the seatback 14 of one or both of the passenger seat 10 to minimize or reduce the movement or rotation of the privacy panel 920.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

Example A. A privacy panel for a passenger seat comprising:
- a main body positioned between adjacent passenger seats and having an upper end and a lower end;
- an attachment mechanism removably coupled to the main body proximate the lower end, wherein the attachment mechanism comprises:
  - a first attachment member couplable to an armrest of the passenger seat; and
  - a second attachment member coupled to the first attachment member;
- wherein the second attachment member is attachable to a fixed location on the passenger seat for preventing rotation of the armrest.

Example B. The privacy panel of any of the preceding or subsequent examples, wherein the main body comprises a concave portion along an edge extending between the upper end and the lower end.

Example C. The privacy panel of any of the preceding or subsequent examples, further comprising at least one stability member coupled to the main body configured to contact a seatback of the adjacent passenger seats resulting in less rotation of an upper portion of the main body.

Example D. The privacy panel of any of the preceding or subsequent examples, wherein the at least one stability member comprises projections that extend outward from opposing surfaces of the main body for contacting the adjacent passenger seats.

Example E. The privacy panel of any of the preceding or subsequent examples, wherein the second attachment member extends from the first attachment member at a first end and couples to a seat structure between the adjacent passenger seats at a second end forms a loop around the fixed location forming a stop.

Example F. The privacy panel of any of the preceding or subsequent examples, wherein the second attachment member extends from the attachment mechanism at a first end and couples to a seat bottom of the passenger seat at the second end.

Example G. The privacy panel of any of the preceding or subsequent examples, wherein, when a passenger is seated, a weight of the passenger prevents rotation of the armrest.

Example H. A privacy panel for a passenger seat comprising:
- a main body positioned between adjacent passenger seats and having an upper end and a lower end;
- an attachment mechanism removably coupled to the main body proximate the lower end, wherein the attachment mechanism comprises:
  - a first attachment member couplable to an armrest of the passenger seat; and
  - a second attachment member coupled to the first attachment member;
- wherein the second attachment member prevents rotation of the armrest.

Example I. The privacy panel of any of the preceding or subsequent examples, wherein the main body comprises a concave portion along an edge extending between the upper end and the lower end.

Example J. The privacy panel of any of the preceding or subsequent examples, further comprising at least one stability member coupled to the main body configured to contact a seatback of the adjacent passenger seats resulting in less rotation of an upper portion of the main body.

Example K. The privacy panel of any of the preceding or subsequent examples, wherein the at least one stability member comprises projections that extend outward from opposing surfaces of the main body for contacting the adjacent passenger seats.

Example L. The privacy panel of any of the preceding or subsequent examples, wherein the second attachment member extends from the first attachment member at a first end and couples to a seat structure between the adjacent passenger seats at a second end forms a loop around the fixed location forming a stop.

Example M. The privacy panel of any of the preceding or subsequent examples, wherein the second attachment member extends from the attachment mechanism at a first end and couples to a seat bottom of the passenger seat at the second end.

Example N. The privacy panel of any of the preceding or subsequent examples, wherein, when a passenger is seated, a weight of the passenger prevents rotation of the armrest.

Example O. A privacy panel for a passenger seat comprising:
- a main body positioned between adjacent passenger seats and having an upper end and a lower end;
- an attachment mechanism removably coupled to the main body proximate the lower end, wherein the attachment mechanism comprises:
  - a first attachment member couplable to an armrest of the passenger seat; and
  - a second attachment member coupled to the first attachment member;
- at least one stability feature positioned on the main body and configured to contact a seatback of the adjacent passenger seats resulting in less rotation of the privacy panel in a lateral direction;
- wherein the second attachment member is attachable to a fixed location on the passenger seat for preventing rotation of the armrest.

Example P. The privacy panel of any of the preceding or subsequent examples, wherein the main body comprises a concave portion along an edge extending between the upper end and the lower end.

Example Q. The privacy panel of any of the preceding or subsequent examples, wherein the second attachment member extends from the first attachment member at a first end and couples to a seat structure between the adjacent passenger seats at a second end forms a loop around the fixed location forming a stop.

Example R. The privacy panel of any of the preceding or subsequent examples, wherein the second attachment member extends from the attachment mechanism at a first end and couples to a seat bottom of the passenger seat at the second end.

Example S. The privacy panel of any of the preceding or subsequent examples, wherein, when a passenger is seated, a weight of the passenger prevents rotation of the armrest.

Example T. The privacy panel of any of the preceding or subsequent examples, wherein the at least one stability comprises at least one projection, wherein the at least one projection extends from a surface of the main body.

What is claimed is:

1. A privacy panel for a passenger seat comprising:
   a main body positionable between adjacent passenger seats and having an upper end and a lower end; and
   an attachment mechanism removably coupled to the main body proximate the lower end, wherein the attachment mechanism comprises:
   a first attachment member configured to engage a circumferential portion of an armrest of the adjacent passenger seats; and
   a second attachment member coupled to the first attachment member, wherein the second attachment member is attachable to a fixed location on the adjacent passenger seats for preventing rotation of the armrest.

2. The privacy panel of claim 1, wherein the main body comprises a concave portion along an edge extending between the upper end and the lower end.

3. The privacy panel of claim 1, wherein the second attachment member extends from the first attachment member at a first end of the second attachment member, couples to a seat structure between the adjacent passenger seats at a second end of the second attachment member, and forms a loop around the fixed location forming a stop.

4. The privacy panel of claim 1, wherein the second attachment member extends from the attachment mechanism at a first end of the second attachment member and couples to a seat bottom of the adjacent passenger seats at a second end of the second attachment member.

5. The privacy panel of claim 4, wherein, when a passenger is seated, a weight of the passenger prevents rotation of the armrest.

6. A privacy panel for a passenger seat comprising:
   a main body positionable between adjacent passenger seats and having an upper end and a lower end; and
   an attachment mechanism removably coupled to the main body proximate the lower end, wherein the attachment mechanism comprises:
   a first attachment member configured to engage a circumferential portion of an armrest of the adjacent passenger seats; and
   a second attachment member coupled to the first attachment member, wherein the second attachment member prevents rotation of the armrest.

7. The privacy panel of claim 6, wherein the main body comprises a concave portion along an edge extending between the upper end and the lower end.

8. The privacy panel of claim 6, further comprising at least one stability member coupled to the main body configured to contact a seatback of the adjacent passenger seats resulting in less rotation of an upper portion of the main body.

9. The privacy panel of claim 8, wherein the at least one stability member comprises projections that extend outward from opposing surfaces of the main body for contacting the adjacent passenger seats.

10. The privacy panel of claim 6, wherein the second attachment member extends from the first attachment member at a first end of the second attachment member, couples to a seat structure between the adjacent passenger seats at a second end of the second attachment member, and forms a loop forming a stop.

11. The privacy panel of claim 6, wherein the second attachment member extends from the attachment mechanism at a first end of the second attachment member and couples to a seat bottom of the adjacent passenger seats at a second end of the second attachment member.

12. The privacy panel of claim 11, wherein, when a passenger is seated, a weight of the passenger prevents rotation of the armrest.

13. A privacy panel for a passenger seat comprising:
   a main body positionable between adjacent passenger seats and having an upper end and a lower end;
   an attachment mechanism removably coupled to the main body proximate the lower end, wherein the attachment mechanism comprises:
   a first attachment member configured to engage a circumferential portion of an armrest of the adjacent passenger seats; and
   a second attachment member coupled to the first attachment member; and
   at least one stability feature positioned on the main body and configured to contact a seatback of the adjacent passenger seats resulting in less rotation of the privacy panel in a lateral direction, wherein the second attachment member is attachable to a fixed location on the adjacent passenger seats for preventing rotation of the armrest.

14. The privacy panel of claim 13, wherein the main body comprises a concave portion along an edge extending between the upper end and the lower end.

15. The privacy panel of claim 13, wherein the second attachment member extends from the first attachment member at a first end of the second attachment member, couples to a seat structure between the adjacent passenger seats at a second end of the second attachment member, and forms a loop around the fixed location forming a stop.

16. The privacy panel of claim 13, wherein the second attachment member extends from the attachment mechanism at a first end of the second attachment member and couples to a seat bottom of the adjacent passenger seats at a second end of the second attachment member.

17. The privacy panel of claim 16, wherein, when a passenger is seated, a weight of the passenger prevents rotation of the armrest.

18. The privacy panel of claim 13, wherein the at least one stability feature comprises at least one projection, wherein the at least one projection extends from a surface of the main body.

* * * * *